United States Patent Office 3,281,493
Patented Oct. 25, 1966

3,281,493
ADHESIVE COMPOSITION COMPRISING A PHENOL - FORMALDEHYDE RESIN, AN EPOXY RESIN, AND A PHENOLIC DIKETONE
David Arthur Thornton, Grahamstown, Cape Province, Republic of South Africa, and Michael Edward Benet Jones, Hitchin, Herts, England, assignors to Ciba Limited, Basel, Switzerland, a Swiss company
No Drawing. Filed Jan. 27, 1965, Ser. No. 428,575
Claims priority, application Great Britain, Aug. 8, 1960, 27,403/60
2 Claims. (Cl. 260—831)

This is a continuation in part of application Serial No. 128,387 filed August 1, 1961 (now abandoned).

This invention relates to ketones and more particularly to a novel class of phenolic diketones, their production and their uses.

According to a first feature of the present invention there is provided a new class of phenolic diketones of the general Formula I:

(I)
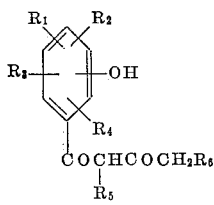

in which the hydroxyl group is in the meta or para position with respect to the β-diketone substituent and wherein the R symbols are the same or different and each represents a hydrogen atom or a hydrocarbon substituent, e.g. an alkyl, aryl, or aralkyl group. This class of compounds, of which the fundamental member is p-hydroxybenzoylacetone (where all the R symbols represent hydrogen), which is itself a preferred member of the class, are valuable sequestering agents for metal ions in resin and adhesive formulations and are useful intermediates in the production of novel resins, in which connection reference is made to our copending patent application Serial No. 128,386 (now abandoned).

The preferred method for the production of compounds of general Formula I, which method is a further feature of the present invention, comprises reacting an ester of a hydroxy compound of the general Formula II:

(II)
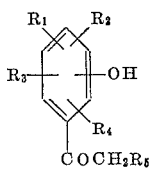

in which the hydroxyl group is in the meta or para position with respect to the —COCH$_2$R$_5$ substituent, with an acid anhydride of the general Formula III (III)  R$_6$CO\
                         \>O\
                     R$_6$CO/ in the presence of a Lewis acid catalyst, decomposing the complex so formed and removing the ester grouping from the product.

The ester grouping is conveniently one derived from a simple aliphatic acid such as acetic acid or propionic acid. The catalyst used is preferably boron trifluoride or a complex thereof, e.g. a complex of boron trifluoride and an acid of the formula R$_6$COOH. The decomposition of the complex formed is conveniently effected by heating and the removal of the ester group by treatment with an alkaline substance, e.g. caustic alkali.

Whilst it might be supposed that direct reaction of a phenol of general Formula II with an acid anhydride of general Formula III would yield a phenolic diketone of general Formula I, it has been found experimentally that such a reaction does not occur, due it is believed to deactivation of the terminal —CH$_2$R$_5$ group (in Formula II) by the phenolic group. It has been found that prior protection of the phenolic group by esterification is necessary for the reaction to proceed in the manner desired.

The following alternative methods for the production of the compounds of general Formula I may be used but these are generally more tedious in practice and afford lower yields:

(a) A m- or p-hydroxybenzoylchloride of the general Formula IV:

(IV)
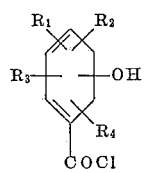

is reacted with a sodio derivative of an acetoacetic ester and the resulting product is saponified and decarboxylated. This process may be exemplified, using the sodio derivative of ethyl acetoacetate, as follows:

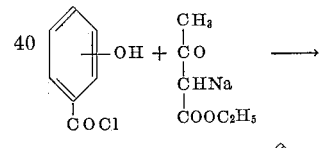

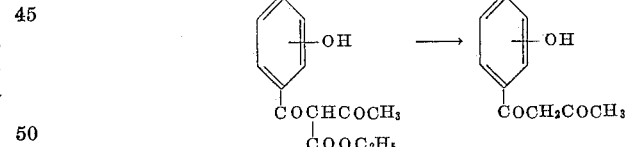

(b) By condensing a phenolic ketone of general Formula II with an ester of the general Formula V:

(V)  R$_6$CH$_2$COOR′ where R′ represents an alkyl or aralkyl grouping in the presence of an alkali metal, e.g. sodium, or an alkali metal alkoxide of the formula MOR′, where M is an atom of an alkali metal.

(c) Where, in general Formula I, the grouping R$_5$ is a hydrocarbon substituent the most suitable method for the production of the compounds is by reaction of a compound of general Formula I in which R$_5$ is a hydrogen atom with potassium tertiary butoxide followed by treatment of the potassium salt so obtained with an alkyl, aryl or aralkyl halide of general formula R$_5$X, in which R$_5$ is the alkyl, aryl or aralkyl group and X is a halogen atom (i.e. a chlorine, a bromine or an iodine atom). After acidification of the reaction mixture, the phenolic diketone of general Formula I (when R$_5$ is a hydrocarbon substituent) is obtained.

The phenolic β-diketones of the present invention are of value as additives to conventional adhesive formulations. It is known that metal to metal joints made with adhesives based on phenol-formaldehydes resins, epoxide resins or mixtures of both these resin types suffer severe loss in strength at high temperatures. The phenolic β-di-ketones of the present invention when included in such adhesive formulations diminish this effect. Such adhesive formulations may contain in addition to the aforementioned constituents, polymeric materials such as superpolyamides or polyvinyl formals and in the presence of these polymeric materials the advantageous effect of the phenolic β-diketone is still exhibited.

The following examples will serve to illustrate the production of phenolic diketones in accordance with the invention.

*Example 1*

Boron fluoride was rapidly passed into acetic acid (120 g.) with ice-cooling until the complex solidified. Ethylene dichloride (80 ml.) was added to facilitate stirring. A mixture of p-acetoxyacetophenone (71.5 g., 1 mol) and acetic anhydride (81.5 g., 2 mols), was added over four minutes. After stirring for 2.5 hours, the mixture was added to a solution of sodium acetate (131 g., 4 mols) in water (2 liters). Ethylene dichloride and some water was removed by distillation, and the resulting solution boiled under reflux for 40 minutes. After cooling, the solid material was collected. The aqueous layer was partially neutralized with aqueous sodium bicarbonate and extracted with ether. The solid and the ether extracts were combined and extracted with 2% aqueous sodium hydroxide. Acidification with dilute hydrochloric acid yielded p-hydroxybenzoylacetone (55.8 g., 78%) M.P. 112° C., which had the following analysis: Found: C, 67.7; H, 5.7; $C_{10}H_{10}O_3$ requires: C, 67.4; H, 5.7%, confirmed by conversion to the acetate which had M.P. 70° C. and the following analysis: Found: C, 66.1; H, 5.6, $C_{12}H_{12}O_4$ requires C, 65.5; H, 5.5%.

*Example 2*

A mixture of p-acetoxyacetophenone (23.4 g., 1.0 mol), acetic anhydride (27.2 g., 2.0 mols) and ethylene dichloride (30 ml.) was saturated with boron fluoride. After stirring for half an hour, a solution of sodium acetate was added and the mixture maintained at 20° C. for 14 hours. The ethylene dichloride was removed and the residual solution (pH 4) was cooled, the precipitated fluorine-containing solid being collected and dried. This fluorine-containing complex was hydrolysed by boiling with aqueous sodium acetate solution, the solution cooled and extracted with chloroform. Removal of the solvent yielded a solid residue, which, after recrystallization from n-hexane, gave p-acetoxybenzoylacetone, M.P. 68–70° C., hydrolysed by 4% sodium hydroxide solution to p-hydroxybenzoyl-acetone, M.P. 110–111° C.

*Example 3*

One half of a solution of sodium (36 g., 2.0 atoms) in absolute ethanol (600 ml.) was added to ethyl acetoacetate (100 g., 2.3 mols). To this mixture one half of a solution of p-hydroxybenzoyl chloride (121 g., 1 mol) in sodium-dried ether (2.5 liters) was slowly added, the temperature being maintained at 0°–10° C. After allowing to stand for 1 hour the remaining sodium ethoxide solution and the remaining chloride solution were slowly added in successive portions over 5 hours. After allowing to stand three days, the product was filtered off and dried. A suspension of the solid product in ice-cold water (1 liter), was acidified with cold, dilute sulfuric acid. The resulting 1-p-hydroxyphenyl-2-carbethoxy-1,3-butandione was collected by filtration and hydrolysed by boiling with dilute sulfuric acid (1 vol. acid: 4 vols. water) for three hours. The precipitated oil was separated and cooled, when it solidified. The product was recrystallized from benzene, yielding 27.5 g. (20%) of p-hydroxybenzoylacetone.

*Example 4* p-Hydroxyacetophenone (500 g., 1 mol) and ethyl acetate (1380 g., 4.3 mols) were slowly added with cooling to sodium wire (206 g., 2.4 atoms). When the reaction had subsided, the mixture was boiled under reflux for four hours, cooled, poured cautiously into water, and extracted with ethyl acetate. The aqueous phase was acidified, affording p-hydroxybenzoylacetone (79.5 g., 12%) M.P. 109°–112° C.

*Example 5*

A solution of ethyl acetate (36 g., 2.2 mols) in sodium-dried toluene (50 ml.) was added to a suspension of sodium ethoxide (25 g., 2.0 mols) in toluene (600 ml.). The mixture was boiled under reflux for seven hours, cooled, poured into water, and the toluene layer separated. The aqueous layer was acidified and the precipitate recrystallized from benzene, yielding 4.8 g. (15%) of p-hydroxybenzoyl-acetone.

*Example 6*

Boron fluoride was rapidly passed into acetic acid (31.2 g.) with ice-cooling until the complex solidified. Ethylene dichloride (30 ml.) was added to facilitate stirring. A mixture of 3-methyl-4-acetoxyacetophenone (25 g.) and acetic anhydride (26.6 g.) was added over four minutes. After stirring for 2.5 hours, the mixture was added to a solution of sodium acetate (33 g.) in water (500 ml.). After working up the reaction mixture following the procedure described in Example 1, 3-methyl-4-hydroxybenzoylacetone, M.P. 95°–96° C., after two recrystallizations from benzene, was obtained and had the following analysis: Found: C, 68.8; H, 6.3; O, 24.7. $C_{11}H_{12}O_3$ requires: C, 68.7; H, 6.3; O, 25.0%.

*Example 7*

Following the procedure described in Example 1 but employing 89 g. p-acetoxyacetophenone in place of the 71.5 g. p-acetoxyacetophenone and 130 g. propionic anhydride in place of the 81.5 g. acetic anhydride, 1-p-hydroxyphenyl-1,3-pentandione, M.P. 48° C., after two recrystalliations from benzene, was obtained, and had the following analysis: Found: C, 68.7; H, 6.0; O, 25.2. $C_{11}H_{12}O_3$ requires: C, 68.7; H, 6.3; O, 25.0%.

*Example 8* p-Hydroxybenzoylacetone (17.8 g.) in tertiary butanol (30 ml.) was added to a solution of potassium (7.8 g.) in tertiary butanol (120 ml.). The mixture was stirred for 30 minutes during which time the potassium derivative separated. Methyl iodide (15.4 g.) was added and the mixture stirred at room temperature for 36 hours, then filtered. The filtrate was diluted with ether, filtered again and the filtrate washed with water. The ether was removed and the residue cooled, whereupon it crystallized. After four recrystallizations from ethanol, pure 1-p-hydroxyphenyl-2-methyl-1,3 - butandione, M.P. 59°–60° C. was obtained and had the following analysis: Found: C, 68.9; H, 6.2. $C_{11}H_{12}O_3$ requires: C, 68.7; H, 6.3%.

As already indicated, the products of the present invention of general Formula I are valuable additions to resin and adhesive compositions. In the case of adhesives, the inclusion of a product of the present invention notably increases the adhesive strength especially at elevated temperatures. This is illustrated as follows:

*Example 9*

An adhesive having the following composition was prepared: 100 parts of a phenol-formaldehyde resin (see below); 100 parts of aluminum powder (200 mesh); 2 parts of a polyvinyl formal sold under the trademark "Formvar 15/95E" (mesh size 30 to 52); 10 parts of an epoxy resin prepared by the interaction of 2,2-bis-(p-hydroxyphenyl)propane and epichlorohydrin under alkaline conditions and having an epoxide content of 2.3 epoxy equivalents per kilogram; 10 parts acetone and 1 part p-hydroxybenzoylacetone. The phenol-formaldehyde resin employed in this formulation was prepared as follows: A mixture was prepared containing phenol (448 g.), neutralized formalin (36.6% by weight of formaldehyde) (560 g.), water (117 g.) and sodium hydroxide (2.1 g.), and the mixture boiled under reflux for 2 to 3 hours. The reaction is complete when 5 ml. of the resin becomes cloudy on cooling to 20° C. The reaction mixture was then cooled to 60° C. and water removed by distillation under reduced pressure until nothing distils at a temperature of 80° C. and a pressure of 30 mm. of mercury. A solution of sodium hydroxide (0.5 g.) in ethanol (25 g.) was added to 75 g. of this resin and heated to 50° C. Hexamine (5 g.) was added and mixed thoroughly until a clear solution was obtained.

Aluminum alloy sheet 16 S.W.G. coated on both surfaces with a layer of pure aluminum, was immersed for 30 minutes at 65° C. in a chromic acid solution prepared by dissolving 15% by volume concentrated sulfuric acid and 7½% by weight sodium dichromate in water. After this pretreatment, the sheet was washed with water and dried. Woven glass cloth of thickness 0.01 cm. sold under the trade name "Marglas" (quality 4A) was dipped in the adhesive and dried for 24 hours at room temperature. Pieces of the adhesive-coated cloth measuring 30.5 cm. by 1.25 cm. were placed between pairs of aluminum panels measuring 30.5 cm. by 11.5 cm. so arranged that the bonded area measured 30.5 cm. x 1.25 cm. Bonding was accomplished by heating the joints at 160° C. for one hour with an applied pressure of 7.03 kg./sq. cm. The bonded panels were subsequently cut to yield single lap joints of bonded area 2.5 x 1.25 cm.

The tensile shear strengths of the joints at different temperatures are shown in the following table in comparison with the tensile shear strengths of joints made under identical conditions except that the p-hydroxybenzoylacetone is omitted.

| Parts of p-hydroxybenzoylacetone in adhesive | Tensile shear strength (kg./sq. cm.) | | |
|---|---|---|---|
| | Room temperature | 200° C. | 250° C. |
| 0 | 177 | 135 | 116 |
| 1 | 184 | 169 | 157 |

What is claimed is:
1. An adhesive composition which comprises (1) a phenol-formaldehyde resin (2) a phenolic diketone of the formula

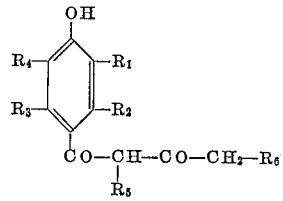

wherein $R_1$, $R_2$, $R_3$, $R_4$, $R_5$ and $R_6$ each are selected from the class consisting of hydrogen atom and lower alkyl group, (3) a 1,2-epoxide resin, and (4) a polyvinyl formal.

2. An adhesive composition which comprises (1) a phenol-formaldehyde resin obtained by condensing phenol with formaldehyde in the presence of alkali; (2) p-hydroxybenzoylacetone; (3) a 1,2-epoxy resin obtained by condensing 2,2-bis(p-hydroxyphenyl)-propane with epichlorhydrine in the presence of alkali and (4) a polyvinyl formal.

References Cited by the Examiner
UNITED STATES PATENTS

| | | | |
|---|---|---|---|
| 2,876,208 | 3/1959 | Naps | 260—831 |
| 2,886,554 | 5/1959 | Schlenker | 260—57 |
| 2,986,546 | 5/1961 | Naps | 260—831 |
| 3,014,939 | 12/1961 | Kluiber | 260—429 |

MURRAY TILLMAN, *Primary Examiner.*

J. BLEUTGE, *Assistant Examiner.*